US012147701B2

United States Patent
Pandurangan et al.

(10) Patent No.: US 12,147,701 B2
(45) Date of Patent: Nov. 19, 2024

(54) SYSTEMS, METHODS, AND DEVICES FOR ACCESSING A DEVICE PROGRAM ON A STORAGE DEVICE

(71) Applicant: Samsung Electronics Co., Ltd., Suwon-si (KR)

(72) Inventors: Rajinikanth Pandurangan, Fremont, CA (US); Changho Choi, San Jose, CA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 44 days.

(21) Appl. No.: 17/527,147

(22) Filed: Nov. 15, 2021

(65) Prior Publication Data

US 2023/0114636 A1 Apr. 13, 2023

Related U.S. Application Data

(60) Provisional application No. 63/255,000, filed on Oct. 12, 2021.

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC .... G06F 3/0659; G06F 3/0604; G06F 3/0679; G06F 3/0656; G06F 3/0607;
(Continued)

(56) References Cited

U.S. PATENT DOCUMENTS 9,170,755 B2   10/2015   Sharifie et al.
10,635,317 B2   4/2020   Kim et al.
(Continued)

FOREIGN PATENT DOCUMENTS

CN   104536701 B    2/2018
KR   20200078331 A   7/2020
KR   20200125389 A   11/2020

OTHER PUBLICATIONS

B. Martin, Computational Storage: Moving Forward with an Architecture and API, Storage Developer Conference, SDC, Virtual Conference, Sep. 28-29, 2021 (Year: 2021).*

(Continued)

*Primary Examiner* — Khoa D Doan
(74) *Attorney, Agent, or Firm* — Renaissance IP Law Group LLP

(57) ABSTRACT

A method may include receiving, at a storage device, a command using a storage protocol, wherein the storage device is configured to execute a user program, and executing, at the storage device, a device program based on the command. The command may be a first command, and the method may further include receiving, at the storage device, using the storage protocol, a second command, and sending, from the storage device, using the storage protocol, information about the device program based on the second command. The method may further include sending, from the storage device, using the storage protocol, a list of device programs supported by the storage device based on the second command. The method may further include providing, by the storage device, output data from the device program. The providing may include sending, from the storage device, using the storage protocol, a log message.

20 Claims, 7 Drawing Sheets

(58) Field of Classification Search
CPC ............ G06F 11/0772; G06F 11/3034; G06F 11/3051; G06F 11/3466; G06F 11/3636; G06F 11/3648; G06F 2212/7203; G06F 2212/7204
See application file for complete search history.

(56) References Cited

U.S. PATENT DOCUMENTS

| | | |
|---|---|---|
| 10,963,190 B2 | 3/2021 | Haga et al. |
| 2005/0246443 A1* | 11/2005 | Yao ..................... H04L 69/325 709/227 |
| 2015/0106574 A1* | 4/2015 | Jayasena ............. G06F 15/7821 711/154 |
| 2016/0140007 A1 | 5/2016 | Cho et al. |
| 2016/0170882 A1* | 6/2016 | Choi ..................... G06F 3/0608 711/119 |
| 2017/0123991 A1 | 5/2017 | Sela et al. |
| 2019/0250852 A1 | 8/2019 | Kabra et al. |
| 2019/0294339 A1* | 9/2019 | Bolkhovitin .......... G06F 3/0607 |
| 2020/0201692 A1 | 6/2020 | Kachare et al. |
| 2020/0341916 A1 | 10/2020 | Subbanna et al. |
| 2021/0042060 A1 | 2/2021 | Kim |

OTHER PUBLICATIONS

Malone, Kim et al., "NVMe Computation Storage Standardizing Offload of Computation via NVMe", Storage Developer Conference, Virtual Conference, 2021, 24 pages.
European Extended Search Report for Application No. 22199515.2, mailed Mar. 3, 2023.
Torabzadehkashi, Mahdi et al., "Computational Storage: An Efficient and Scalable Platform for Big Data and HPC Applications," Journal of Big Data, vol. 6, No. 1, 2019, 29 pages.

* cited by examiner

SYSTEMS, METHODS, AND DEVICES FOR ACCESSING A DEVICE PROGRAM ON A STORAGE DEVICE

CROSS-REFERENCE TO RELATED APPLICATIONS

This application claims priority to, and the benefit of, U.S. Provisional Patent Application Ser. No. 63/255,000 titled "Systems, Methods, and Devices for Computational Storage Operations" filed Oct. 12, 2021 which is incorporated by reference.

TECHNICAL FIELD

This disclosure relates generally to storage systems, and more specifically to systems, methods, and devices for accessing a device program on a storage device.

BACKGROUND

A computational storage device may include one or more processing resources that may operate on data stored within the device. A host may offload a processing task to the storage device, for example, by sending a user program and/or input data for the user program to the device. The one or more processing resources may execute the user program and send output data from the user program to the host.

The above information disclosed in this Background section is only for enhancement of understanding of the background of the inventive principles and therefore it may contain information that does not constitute prior art.

SUMMARY

A method may include receiving, at a storage device, a command using a storage protocol, wherein the storage device is configured to execute a user program, and executing, at the storage device, a device program based on the command. The command may be a first command, and the method may further include receiving, at the storage device, using the storage protocol, a second command, and sending, from the storage device, using the storage protocol, information about the device program based on the second command. The method may further include sending, from the storage device, using the storage protocol, a list of device programs supported by the storage device based on the second command. The method may further include providing, by the storage device, output data from the device program. The providing may include sending, from the storage device, using the storage protocol, a log message. The command may be a first command, the method may further include receiving, at the storage device, using the storage protocol, a second command, wherein sending the log message may be based on the second command. The providing may include placing the output data from the device program in a buffer. The method may further include reading from the buffer, by a host, using the storage protocol, the output data from the device program. The buffer may be located, at least partially, in a memory shared by the storage device and the host. The storage device may be configured to receive, using the storage protocol, the user program. The device program may monitor the user program. The device program may control the user program. The device program may include a utility program. The device program may include one or more of a tracing program, a debugging program, a profiling program, a monitoring program, a task manager program, or a message retrieval program. The user program may include a kernel, and the device program may include a performance tool for the kernel. Receiving the command may include receiving an argument for the command.

A storage device may include a storage medium, a storage device controller configured to store data in the storage medium, a storage interface configured to receive, using a storage protocol, a command, and at least one processing element configured to execute a user program, and execute, based on the command, a device program. The device may further include processing control logic configured to provide output data from the device program. The processing control logic may include a buffer configured to store the output data. The buffer may be located, at least partially, in a shared memory. The command may be a first command, and the processing control logic may be configured to send the output data, using the storage interface, based on a second command received using the storage interface. The command may be a first command, and the storage device may further include processing control logic configured to send, using the storage interface, information about the device program based on a second command received using the storage interface.

A system may include: a host including a first storage interface configured to exchange information using a storage protocol, and host control logic configured to send, using the storage interface, a command; and a storage device including a second storage interface configured to exchange information with the host using the storage protocol, processing control logic configured to receive, from the host using the second storage interface, the command, and at least one processing element configured to execute a user program, and execute, based on the command, a device program. The host control logic may be further configured to send, to the storage device, using the first storage interface, the user program, and the processing control logic may be further configured to receive, from the host using the second storage interface, the user program. The host control logic may be further configured to receive, from the storage device, using the first storage interface, output data from the device program, and the processing control logic may be further configured to send, to the host, using the second storage interface, the output data from the device program. The device program may be a first device program, and the processing control logic may be further configured to send, to the host, using the second storage interface, information about the first device program and information about a second device program.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
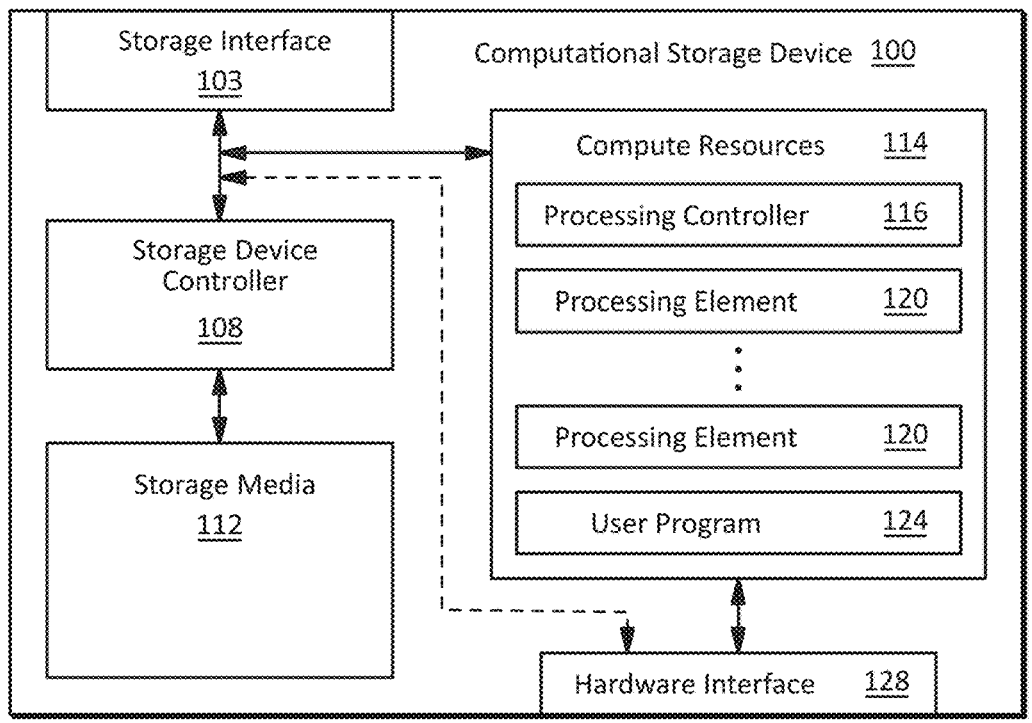
FIG. 1 illustrates an embodiment of a computational storage device in accordance with example embodiments of the disclosure.

A computational storage device may execute a user program that may be developed and/or provided by the user. To monitor and/or troubleshoot the operation of the user program on the storage device, the user may want to use one or more device programs that may provide supporting features such as tracing, debugging, profiling, and/or the like. However, the user may not be able to access a device program through the storage protocol used by the device, or the user may only be able to access a supporting feature by connecting additional hardware to the device.

A computational storage device in accordance with example embodiments of the disclosure may enable a user (e.g., an application running on a host) to access a device program using a storage protocol such as Nonvolatile Memory Express (NVMe). For example, in some embodiments, a user may start a device program by sending a command to the storage device using a storage protocol. The command may include, for example, the name of the device program to execute, one or more parameters to pass to the device program, a pointer to a memory area that may be used to exchange input and/or output data between the device program and an application running on the host, and/or the like.

In some embodiments, in response to a query command from a host, a computational storage device may return a list of device programs that may be supported by the storage device and/or accessible to a user through a storage protocol.

A user may also obtain output data from a device program using a storage protocol. For example, in some embodiments, a host may collect a stream of output data such as logs, debug messages, and/or the like, from a device program by directly reading the output data from a buffer using the storage protocol. In such an embodiment, a host and a storage device may exchange output data from a device program through a ring buffer using a producer-consumer model in which the device may produce data and the host may consume data. As another example, in some embodiments, a host may obtain output data from a device program by receiving the data in a message (e.g., a log and/or debug message) from the storage device in response to a command sent by the host using the storage protocol.

In some embodiments, a device program may refer to any instructions (e.g., a program, kernel, module, subroutine, interrupt handler, driver, and/or the like) that may be executed on a computational storage device and may enable a user to manage the storage device, manage one or more user programs on the storage device, access one or more supporting features implemented on the storage device (e.g., tracing, debugging, profiling, and/or the like), access an operating system on the storage device, and/or the like. Examples of device programs may include utilities, which may analyze, configure, optimize, maintain, monitor, and/or the like, the storage device, and/or a user program (e.g., a user application) running on the storage device. Examples of utilities may include device programs that may run on the storage device and trace, debug, profile, and/or the like, a user program running on the storage device. In some embodiments, a device program may be provided by a supplier (e.g., a manufacturer, vendor, and/or the like) of the computational storage device. In some embodiments, a device program may also be referred to as a command. (For example, in some command line interfaces (CLIs) for some operating systems, some programs may be referred to as commands.)

In some embodiments, a computational storage device may provide a user with controlled access to the storage device and/or one or more device programs using a storage protocol. For example, in some embodiments, a computational storage device may provide a user with access to one or more device programs based on one or more user privileges. As another example, in some embodiments, a computational storage device may provide a user with access to a limited number of device programs that may implement a limited number of features. Depending on the implementation details, this may prevent a user from accessing other features and/or portions of a storage device. In some embodiments, a computational storage device and/or one or more device programs may expose computational program memory (CPM) and/or device local memory (DLM) to a user using a storage protocol.

FIG. 1 illustrates an embodiment of a computational storage device in accordance with example embodiments of the disclosure. The computational storage device 100 illustrated in FIG. 1 may include a storage interface 103, a storage device controller 108, a storage medium 112, and one or more compute resources 114. The one or more compute resources 114 may include a processing controller 116, one or more processing elements 120, and a user program 124.

The storage interface 103 may implement a storage protocol such as NVMe. The processing controller 116 may cause the one or more processing elements 120 to execute the user program 124, for example, to perform one or more computations on data stored in the storage media 112. Thus, the user program 124 may implement one or more processing functions such as compression, encryption, microservices, and/or the like, that may be offloaded, for example, from a host. The user may send input data to the user program 124 and receive output data from the user program 124 through the storage interface 103 using the storage protocol. In some embodiments, the processing controller 116 may enable a user (e.g., an application running on a host) to load, activate, and/or execute one or more user programs using the storage protocol.

The user program 124 may be developed and/or provided by a user, and therefore, the user may want to trace, debug, profile, and/or the like, the operation of the user program 124 on the computational storage device 100. In some embodiments, a user may connect one or more hardware debugging tools (e.g., Trace32) to the storage device 100 through a hardware interface 128 as shown in FIG. 1. The hardware interface 128 may be implemented, for example, using one or more software hooks and/or a Joint Test Action Group (STAG) and/or Serial Wire Debug (SWD) connection. However, the use of a hardware interface may be expensive and/or difficult to implement, especially for example, with a computational storage device at a remote location.

In some embodiments, the computational storage device 100 may run an operating system (e.g., an embedded operating system) that may have utilities that may provide supporting features such as tracing, debugging, profiling, and/or the like. Some examples may include programs such as Itrace, strace, dmesg, top, cpuinfo, ebpf tools, and/or the like. However, the user may not be able to access these utilities, which may be implemented as device programs, through the storage protocol used by the device.

Figure 2:
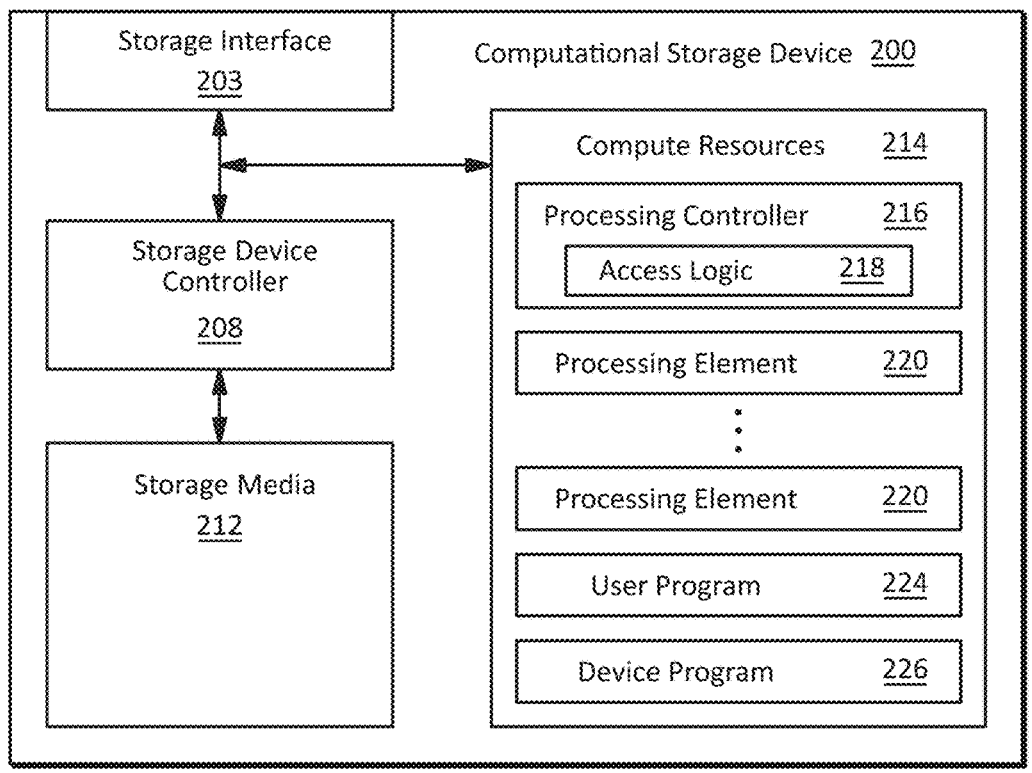
FIG. 2 illustrates an embodiment of a computational storage device with user access to a device program in accordance with example embodiments of the disclosure.

FIG. 2 illustrates an embodiment of a computational storage device with user access to a device program in accordance with example embodiments of the disclosure. The computational storage device 200 illustrated in FIG. 2 may include components similar to those illustrated in FIG. 1 in which references numerals ending in the same digits may indicate components that may perform similar functions. However, the embodiment illustrated in FIG. 2 may include a device program 226 and device program access logic 218 that may enable a user to access the device program 226 using the storage protocol implemented by the storage interface 203.

In some embodiments, the device program 226 may implement any type of functionality including functionality for tracing, debugging, profiling, and/or the like, a user program. Depending on the implementation details, this may enable a user to access intermittent information about the user program (e.g., debug messages, log messages, control flow, profile data, current resource usage, and/or the like without using additional hardware.

Figure 3:
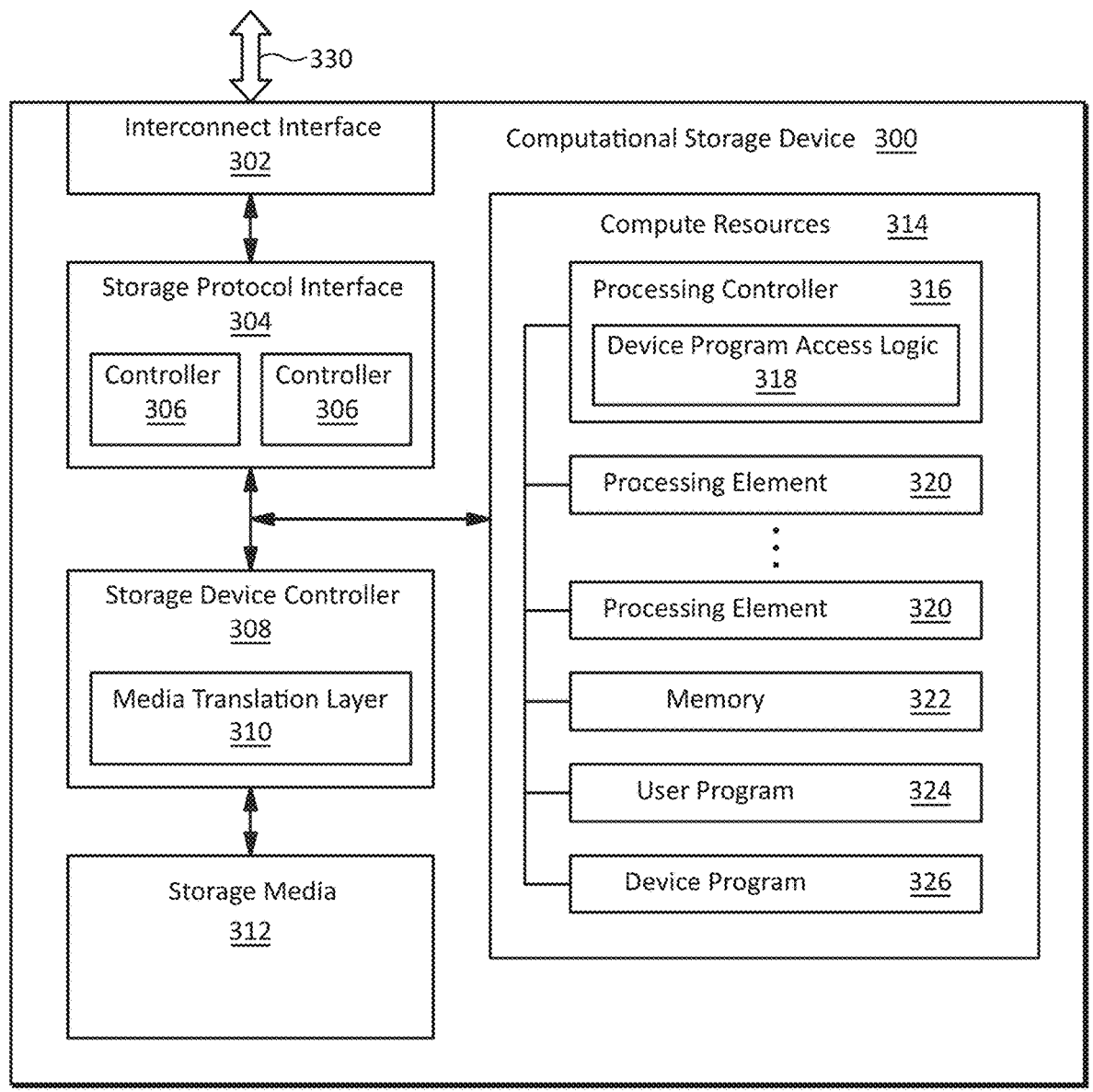
FIG. 3 illustrates a more detailed example embodiment of a computational storage device in accordance with example embodiments of the disclosure.

FIG. 3 illustrates an embodiment of a computational storage device in accordance with example embodiments of the disclosure. The storage device 300 illustrated in FIG. 3 may be used, for example, to implement the computational storage device 200 illustrated in FIG. 2.

Referring to FIG. 3, the storage device 300 may include an interconnect interface 302, a storage protocol interface 304, a storage device controller 308, a storage medium 312, and one or more compute resources 314.

The interconnect interface 302 and storage protocol interface 304 may implement any interconnects and/or storage protocols including Peripheral Component Interconnect Express (PCIe), NVMe, NVMe-over-fabric (NVMe-oF), Ethernet, Transmission Control Protocol/Internet Protocol (TCP/IP), remote direct memory access (RDMA), RDMA over Converged Ethernet (ROCS), FibreChannel, InfiniBand, Serial ATA (SATA), Small Computer Systems Interface (SCSI), Serial Attached SCSI (SAS), iWARP, and/or the like, or any combination thereof. For example, in some embodiments, the interconnect interface 302 may implement a PCIe interconnect, and the storage protocol interface 304 may implement an NVMe protocol.

In some embodiments, the interconnect interface 302, storage protocol interface 304, and/or other components of the storage device 300 may implement a coherent (e.g., memory coherent, cache coherent, and/or the like) or memory semantic interface such as Compute Express Link (CXL), and/or a coherent protocol such as CXL.mem, CXL.cache, and/or CXL.IO. Other examples of coherent and/or memory semantic interfaces and/or protocols may include Gen-Z, Coherent Accelerator Processor Interface (CAPI), Cache Coherent Interconnect for Accelerators (CCIX), and/or the like.

The storage device may be connected to one or more hosts and/or other devices through fabric 330 which may be implemented, for example, with interconnect fabric such as PCIe, network fabric such as Ethernet, and/or the like, or any combination thereof.

In some embodiments, the interconnect interface 302 may include circuitry such as one or more transmitters, receivers, buffers, and/or the like to establish the connections between the storage device 300 and one or more hosts and/or other devices through the fabric 330. The storage protocol interface 304 may include one or more storage protocol controllers 306 (e.g., NVMe controllers). In some embodiments, the storage protocol interface 304 may implement any number of ports, connections, and/or controllers 306. The one or more controllers 306 may be allocated, for example, such that each controller is associated with a virtual machine (VM) at a host. The storage protocol interface 304 may perform input and/or output (I/O) command processing which may involve tasks such as decoding commands, fetching physical region pages (PRPs) which may contain physical memory page address that may define physical memory pages, exchanging data between a host and the storage device 300, maintaining one or more command submission queues and/or completion queues, and/or the like.

The storage media 312 may be implemented with any type of nonvolatile storage media based on solid state media, magnetic media, optical media, and/or the like. For example, in some embodiments, a computational storage device may be implemented as an SSD based on not-AND (NAND) flash memory, persistent memory such as cross-gridded nonvolatile memory, memory with bulk resistance change, phase change memory (PCM), and/or the like, or any combination thereof.

The storage device controller 308 may include a media translation layer 310 that may perform one or more functions related to maintaining and/or operating the storage media 312 such as logical-to-physical mapping of addresses, garbage collection, and/or the like. For example, in an embodiment in which the storage media 312 is implemented with flash memory, the media translation layer 310 may be implemented as a flash translation layer (FTL).

The compute resources 314 may include any type of resources that may be used to provide near-storage computation functionality. For example, in the embodiment illustrated in FIG. 3, the compute resources 314 may include a processing controller 316, one or more processing elements 320, memory 322, user program storage 324, and/or device program storage 326.

Any of the processing elements 120, 220, and/or 320 illustrated in FIG. 1, FIG. 2, and/or FIG. 3 may include any type of apparatus that may process data including combinational logic, sequential logic, one or more timers, counters, registers, and/or state machines, one or more complex programmable logic devices (CPLDs), field programmable gate arrays (FPGAs), application specific integrated circuits (ASICs), central processing units (CPUs) such as complex instruction set computer (CISC) processors such as x86 processors and/or reduced instruction set computer (RISC) processors such as ARM processors, graphics processing units (GPUs), neural processing units (NPUs), tensor processing units (TPUs) and/or the like, executing instructions stored in any type of memory, or any combination thereof. One or more of the processing elements 320 may include fixed and/or programmable functionality to perform any functions such as compression and/or decompression, encryption and/or decryption, microservices, erasure coding, video encoding and/or decoding, database acceleration, search, machine learning, graph processing, and/or the like.

The memory 322 may provide working memory for any of the operations of the compute resources 314 such as operand storage, scratchpad memory, program storage, cache space, buffers, queues, tables, and/or the like. The memory 322 may be implemented with any type of memory including volatile memories such as dynamic random access memory (DRAM) and/or static random access memory (SRAM), any type of nonvolatile memory including nonvolatile random access memory (NVRAM), flash memory, persistent memory, and/or the like or any combination thereof.

The user program storage 324 and/or device program storage 326 may include storage for one or more user programs and/or one or more device programs, respectively. The user program storage 324 and/or device program storage 326 may be implemented with volatile and/or nonvolatile memory or a combination thereof. For example, in some embodiments, nonvolatile memory may be used to preserve some or all of the contents of the user program storage 324 and/or device program storage 326 across power cycles and/or device reset cycles. In some embodiments, some or all of the user program storage 324 may be implemented with volatile memory, in which case, the user may reload one or more user programs after a power cycle and/or device reset cycle. In some embodiments, some or all of the user program storage 324 and/or device program storage 326 may be implemented with the storage media 312.

The processing controller 316 may include any type of logic to control the overall processing (e.g., computational) operations of the compute resources 314. For example, the processing controller may implement one or more computational storage commands received from a user (e.g., an application running on a host) through the storage protocol interface 304. Examples of computational storage commands may include commands to download a user program from a host, execute a user program, transfer input and/or output data for a user program to and/or from the storage media 312 and/or a host or other device through the storage protocol interface 304 and/or the like.

The processing controller 316 may include device program access logic 318 (which may also be referred to as device program logic or access logic). The device program access logic 318 may implement one or more functions that may enable a user (e.g., an application running on a host) to access one or more device programs of the computational storage device 300.

Figure 4:
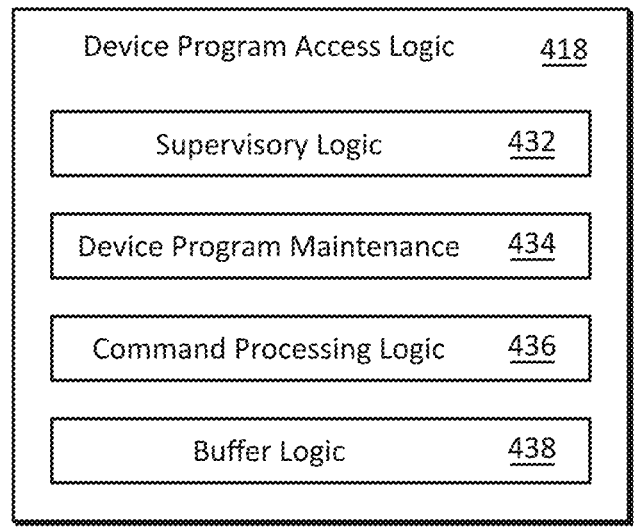
FIG. 4 illustrates an example embodiment of device program access logic in accordance with example embodiments of the disclosure.

FIG. 4 illustrates an example embodiment of device program access logic in accordance with example embodiments of the disclosure. The device program access logic 418 illustrated in FIG. 4 may be used, for example, to implement the device program access logic 318 illustrated in FIG. 3.

Referring to FIG. 4, the device program access logic 418 may include supervisory logic 432, device program maintenance logic 434, command processing logic 436, and/or buffer logic 438.

The supervisory logic 432 may control the overall operation of the device program access logic 418, for example, coordinating the operations of the other logic, 434, 436, and/or 438.

The device program maintenance logic 434 may maintain a list of supported device programs that may be present in the storage device 300. In some embodiments, the device program maintenance logic 434 may delete unused and/or unneeded device programs from the device program storage 326 and/or load new device programs into the device program storage 326. In some embodiments, device programs may be loaded (e.g., preloaded) into the computational storage device 300 when the device is manufactured and/or supplied to an end user. In some embodiments, the device program maintenance logic 434 may load one or more new device programs into the device program storage 326, for example, as a field firmware update and/or upgrade after the storage device 300 is delivered to an end user.

In some embodiments, the supervisory logic 432 may control access, by one or more users, to one or more device programs based, for example, on a user's requested feature set, level of privilege, service level agreement, subscription agreement, and/or the like. For example, a storage device may be preloaded with one or more device programs requested by a user. As another example, a user may purchase a storage device 300 with a baseline collection of device programs supported (e.g., enabled for access), The user may later purchase an upgrade that may enable one or more additional device programs for access by the user.

The command processing logic 436 may process commands received through the storage protocol interface 304 relating to any of the device program access operations disclosed herein. For example, the command processing logic 436 may respond to a query command from a user by returning a list of supported device programs. As another example, in response to receiving a start command from a user, the command processing logic 436 may launch a device program specified in the start command. In some embodiments, the command processing logic 436 may pass one or more parameters received from the user to a device program when launching the device program.

In some embodiments, the command processing logic 436 may validate a start command received from a user, for example, by confirming that the specified device program is supported by the device, confirming that the specified device program is accessible to the user based, for example, on the user's level of privilege, confirming that start command is passing the correct number and/or type of parameters to the specified device program, and/or the like. If the start command is validated, the command processing logic 436 may launch the device program for execution by one or more of the processing elements 320. If the start command is not validated, the command processing logic 436 may return an error to the user.

The buffer logic 438 may maintain any type of buffer that may enable a user (e.g., an application running on a host) to receive output data from one or more device programs. The buffer logic 438 may maintain one or more buffers, for example, in the computational resource memory 322. In some embodiments, a device program may temporarily store output data from a device program, for example, in the form of one or more logs and/or debug messages. The buffer logic 438 may notify the user that output data is available, for example, through an interrupt, a status bit in a status register, and/or the like. The user may then send a read command to the device program access logic 418 which may cause the buffer logic 438 to send the output data from the buffer to the user using the storage protocol. Additionally, or alternatively, in some embodiments, a device program may temporarily store output data from a device program in a ring buffer arranged in a producer-consumer model in which the device may produce data and the user (e.g., an application running on a host) may consume the data.

Any of the functionality described herein including that described with respect to FIG. 1, FIG. 2, FIG. 3, and/or FIG. 4, may be implemented with hardware, software, or any combination thereof. For example, any of the processing controllers 116, 216, and/or 316, access logic 218, and/or device program access logic 318 and/or 418 may be implemented with combinational logic, sequential logic, one or more timers, counters, registers, state machines, volatile and/or nonvolatile memories, CPLDs, FPGAs, ASICs, CPUs including CISC processors such as x86 processors and/or RISC processors such as ARM processors, GPUs, NPUs, TPUs, and/or the like, executing instructions stored in any type of memory. In some embodiments, one or more components may be implemented as a system-on-chip (SOC).

In some embodiments, the computational resources 314 may implement an operating system (OS), for example, an embedded operating system such as embedded Linux, Tizen, embedded Windows, and/or the like, but any type of operating system may be used.

Figure 5:
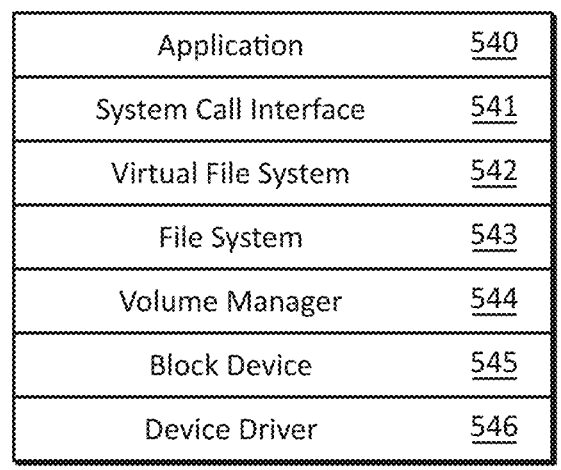
FIG. 5 illustrates an example embodiment of a software stack that may be implemented in an embedded operating system running in a computational storage device having one or more user accessible device programs logic in accordance with example embodiments of the disclosure.

FIG. 5 illustrates an example embodiment of a software stack that may be implemented in an embedded OS running in a computational storage device having one or more user accessible device programs logic in accordance with example embodiments of the disclosure. The software stack illustrated in FIG. 5 may include an application layer 540, a system call interface 541, a virtual file system 542, a file system 543, a volume manager 544, a block device (e.g., a block storage device which may be implemented, for example, as a computational storage device) 545, and/or a device driver 546. Although the layers may be shown in a specific order from top to bottom in FIG. 5, in other embodiments, the order of one or more of the layers may be rearranged, one or more of the layers may be omitted, and one or more other layers may be included.

One or more device programs (e.g., utilities) may be used to analyze, configure, optimize, maintain, monitor, trace, debug, profile, and/or the like, the application (e.g., a user program) running on an operating system implemented with compute resources (e.g., compute resources 314 in FIG. 3) in a computational storage device in accordance with example embodiments of the disclosure. Some of these device programs may be developed and/or provided by a supplier of the storage device. Some of these device programs may already exist, for example, for an operating system such as embedded Linux.

Examples of utilities for the application layer 540 may include ucallsuf low, uobjnew ustat, uthreads ugc, mysqld_gslower, dbstat dbslower, bashreadline, mysqld-_clat, bashf unc, bashfunclat, and/or the like.

Examples of utilities for the system call interface layer 541 may include opensnoop, stat snoop, syncsnoop, scread, ioprofile, and/or the like.

Examples of utilities for the virtual file system layer 542 may include filetop javathreads gethostlatency, filelife fileslower, vfscount, vfsstat, filetype, fsrwstat, vfssize, mmapfiles, writesync, cachestat, cachetop, dcstat, dcsnoop, mountsnoop, icstat, bufgrow, readahead, writeback, and/or the like.

Examples of utilities for the file system layer 543 may include btrfsdist, btrfsslower, ext4dist, ext4slower, nfsslower, nfsdist, xfsslower, xfsdist, zfsslower, zfsdist, overlayfs, and/or the like.

Examples of utilities for the volume manager layer 544 may include mdflush, and/or the like.

Examples of utilities for the block device layer 545 may include biotop, biosnoop, biolatency, bitesize, seeksize, biopattern, biostacks, bioerr, iosched, blkthrot, scsilatency, scsiresult, and/or the like.

Examples of utilities for the device driver layer 546 may include nvmelatency, and/or the like.

Figure 6:
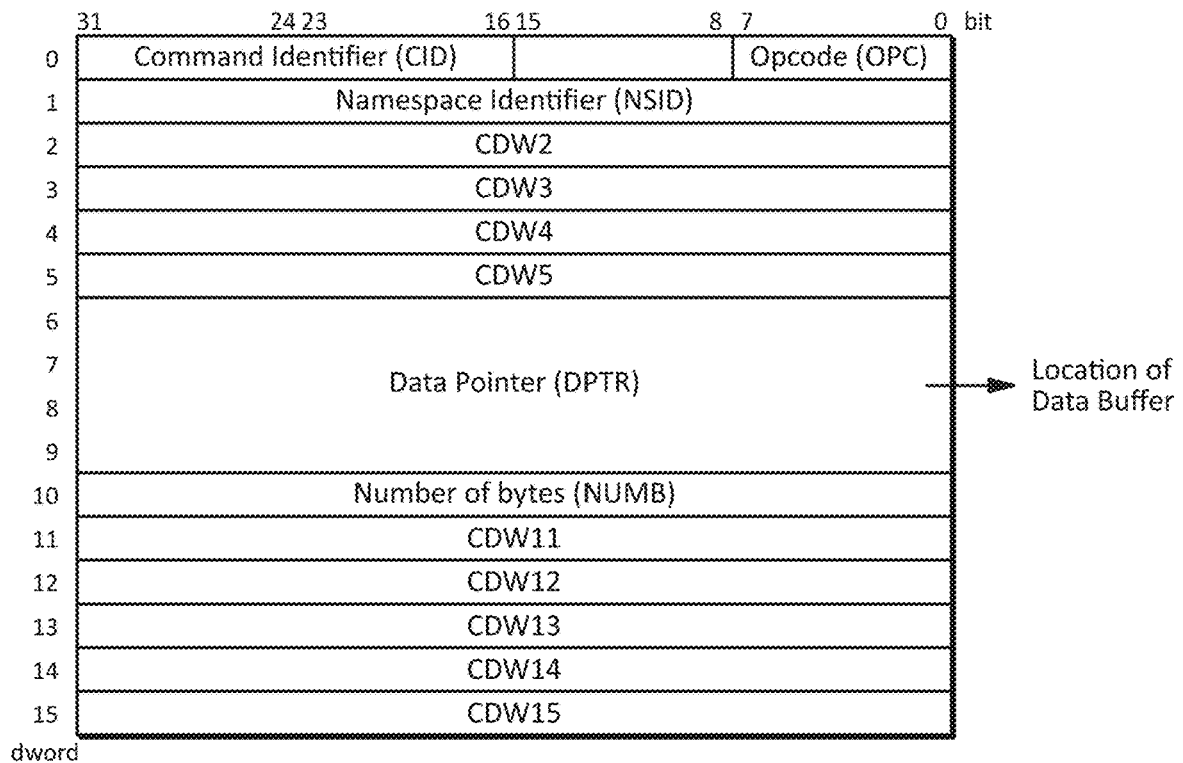
FIG. 6 illustrates an example embodiment of a query command in accordance with example embodiments of the disclosure.

In some embodiments, a user program may be implemented as a software kernel, for example, built as an extended Berkeley Packet Filter (eBPF) code binary. The software kernel may run (e.g., on a virtual machine (VM)) in an embedded OS such as embedded Linux implemented with the compute resources 314 illustrated in FIG. 3. In such an embodiment, one or more device programs (e.g., those described above with respect to FIG. 5) may be implemented as a performance tool (e.g.,. eBPF performance tools) that may provide observability, monitoring tracing, debugging, profiling, and/or the like, of the user application, FIG. 6 illustrates an example embodiment of a query command in accordance with example embodiments of the disclosure. The embodiment illustrated in FIG. 6 may be used, for example, by a user (e.g., an application running on a host) to obtain a list of supported device programs on a computational storage device that may be accessible to the user. For purposes of illustrating the principles of the disclosure, the command format illustrated in FIG. 6 may be used, for example with an NVMe protocol. However, any other command format and/or storage protocol may be used.

The command illustrated in FIG. 6 may include a command identifier (CID) an opcode (OPC), a namespace identifier (NSID), one or more command double words (CDWx), where x may be any number (e.g., 2 through 5 and/or 11 through 15), a data pointer (DPTR), and/or a number of bytes (NUMB). In some embodiments, the components of the command illustrated in FIG. 6 may be specified as follows. The CID may be used, for example, to track the specific command in a submission queue and/or a completion queue. The OPC may indicate the type of command. In this example, the OPC may indicate that the command is a query command. In response to receiving this command, a computational storage device may return a list of supported device programs on a computational storage device that may be accessible to the user.

The NSID may indicate a specific storage device to which the command may be directed. For example, in an embedded Linux implementation, an exemplary NSID may be "/dev/nvme0/." The command double words CDW2-CDW5 and/or CDW11-CDW15 may be unused in this example. The DPTR may point to a location of a data buffer where the computational storage device may place a list (e.g., an updated list if this command has been used before) of the supported device programs on the computational storage device that may be accessible to the user. The storage device may place this list in the data buffer, for example, in response to a query command. The data buffer may be located, for example, at a storage device, at a host, at any other location, or distributed between multiple locations, in some embodiments, a memory location pointed to by DPTR may also be used to pass one or more parameters to the storage device. For example, a storage device may identify one or more device programs be included in the list returned by the storage device based on a user identifier (user ID) parameter. Other examples of parameters that may be passed may include an authorization token, a program type, and/or the like. The NUMB may indicate the number of bytes used in the data buffer pointed to by DPTR.

Figure 7:
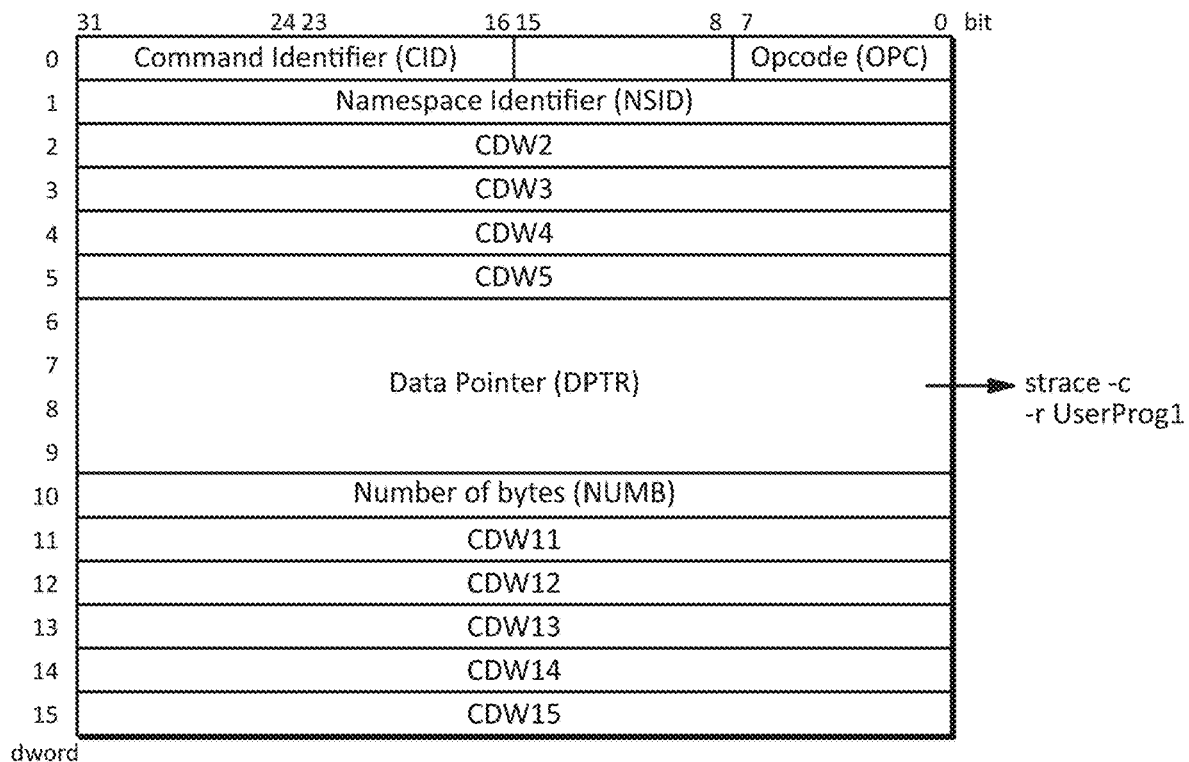
FIG. 7 illustrates an example embodiment of a start command in accordance with example embodiments of the disclosure.

FIG. 7 illustrates an example embodiment of a start command in accordance with example embodiments of the disclosure. The embodiment illustrated in FIG. 6 may be used, for example, by a user (e.g., an application running on a host) to start (e.g., run or begin execution of) a device program using the compute resources of a computational storage device. For purposes of illustrating the principles of the disclosure, the command format illustrated in FIG. 7 may be used, for example with an NVMe protocol. However, any other command format and/or storage protocol may be used.

The command illustrated in FIG. 7 may include a CID, OPC, NSID, one or more CDWx double words, DPTR, and/or NUMB that may be similar to those described above with respect to the query command illustrated in FIG. 6. However, the command illustrated in FIG. 7 may have a different OPC to indicate that the command is a start command. Additionally, or alternatively, the memory space in the data buffer pointed to by DPTR in the start command illustrated in FIG. 7 may include, for example, the name of the device program to execute and/or one or more input arguments for the device program. The data buffer may be located, for example, at a storage device, at a host, at any other location, or distributed between multiple locations.

For example, prior to calling a device program "strace" to trace the execution of a user program called "UserProg1," a user may place the following information in the data buffer pointed to by DPTR: "strace-c-r UserProg1" where "strace" indicates to run the strace device program, the "-c" parameter indicates to count the number of system calls, the "-r" parameter indicates to timestamp each call, and the "UserProg1" parameter indicates that "UserProg1" is the user program whose execution is to be traced. In some embodiments, the data buffer may be populated (at least partially) automatically, for example, by an application running on a host, a driver on a host, a computational storage device, and/or the like, in response to a command to execute a device program.

The user may then send the start command to the computational storage device, which may begin executing the strace program on the UserProg1 program and provide output data from the strace program to the user (e.g., an application running on a server) by placing the output data in the data buffer pointed to by DPTR. For example, if the data buffer is located at least partially at the storage device, the device program (in this example, the strace program) may place output data in the data buffer at the device. As another example, if the data buffer is located at least partially at a host, the device program may send output data to the data buffer at the host using the storage protocol.

As another example, to launch a device program "dmesg" to obtain error and/or warning messages from a kernel, the user may place the following information in the data buffer pointed to by DPTR: "dmesg –level=err,warn" where "-level=err,warn" are parameters that indicate to only return error and warning messages. The User may then send the start command to the computational storage device, which may begin executing the dmesg device program and provide output data from the dmesg program to the user (e.g., an application running on a server) by placing the output data in the data buffer pointed to by DPTR.

As a further example, to launch a device program "top" to show processes running on the operating system, the user may place the following information in the data buffer pointed to by DPTR: "top-b-n 5>top-5iterations.txt" where the parameter "-b" indicates to operate in batch mode, the parameter "-n 5" indicates to exit after 5 iterations, and the parameter "top-5iterations.text" indicates the name of a text file for the output data of the top device program. The User may then send the start command to the computational storage device, which may begin executing the top device program and provide output data from the top program to the user (e.g., an application running on a server) by placing the output data (in this example, a filed named "top-5iterations.text") in the data buffer pointed to by DPTR.

With any of the three examples described above (e.g., strace, dmesg, and/or top), the user may collect the output data from the data buffer, for example, using a first technique in which the host may directly read the output data (e.g., one or more logs and/or debug messages) using a ring buffer (e.g., in a shared memory space accessible to both the host and the computational storage device) configured for a producer-consumer model in which the computational storage device may be a producer and the host may be a consumer. As another example, using a second technique, the host may collect the output data from the data buffer by sending a read command (e.g., a getlog command) to the storage device which may respond by sending the output data from the data buffer to the host in a command response.

Figure 8:
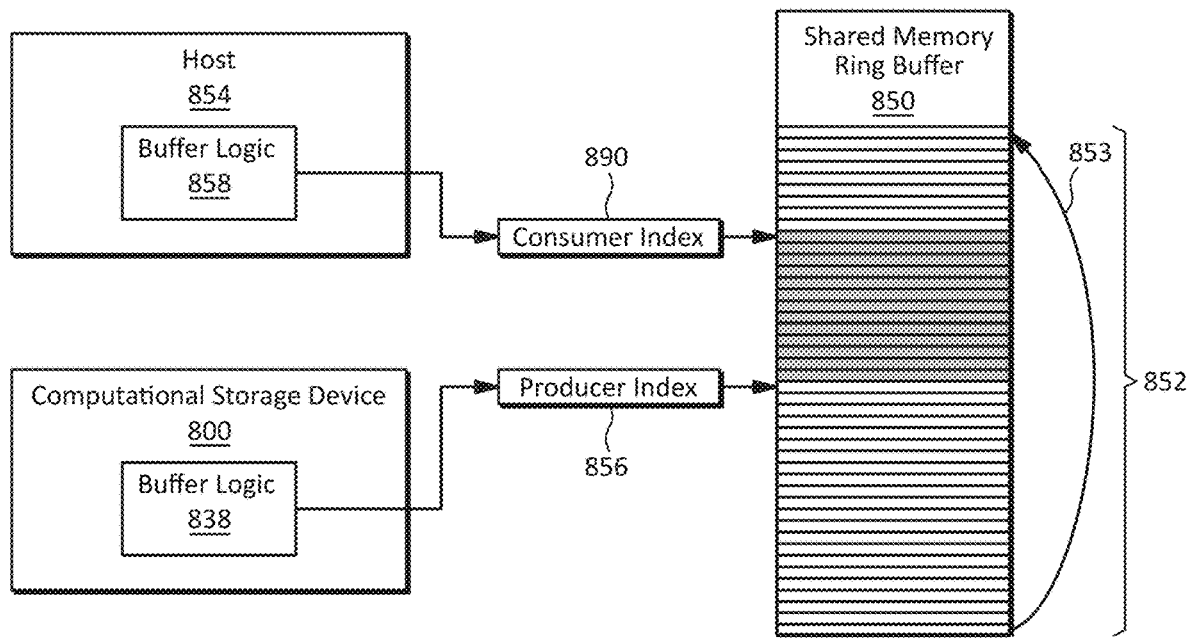
FIG. 8 illustrates an example embodiment of a ring buffer scheme in accordance with example embodiments of the disclosure.

FIG. 8 illustrates an example embodiment of a ring buffer scheme in accordance with example embodiments of the disclosure. The embodiment illustrated in FIG. 8 may be used, for example, to implement a ring buffer that may be located in the memory 322 illustrated in FIG. 3 and maintained by the buffer logic 438 illustrated in FIG. 4. Additionally, or alternatively, some or all of the ring buffer and/or buffer logic may be located at a host or distributed between a host and a storage device. The embodiment illustrated in FIG. 8 may be used, for example, to implement some or all of a data buffer pointed to by the data pointer DPTR in the embodiments illustrated in FIG. 6 and FIG. 7.

Referring to FIG. 8, a ring buffer 850 may be implemented with memory locations (e.g., contiguous memory locations) 852. The memory locations 852 may be arranged as a ring by looping the addressing of the location at the bottom of the ring buffer 850 back to the top as shown by arrow 853. Shading may indicate an occupied portion of the buffer. In the example illustrated in FIG. 8, the ring buffer 850 may be located at a shared memory location that may be accessible to a host 854 and a computational storage device 800. In some embodiments, the computational storage device 800 may be configured as a producer, and the host 854 may be Implemented as a consumer.

Buffer logic 838 at the storage device 800 may place new entries (e.g., output data such as logs and/or debug messages from one or more device programs) into the ring buffer 850 at a memory location pointed to by a producer index 856. The producer index 856 may be incremented to point to the next available memory location each time the buffer logic 838 places a new entry into the ring buffer 850.

Buffer logic 858 at the host 854 may read entries from the ring buffer 850 at a memory location pointed to by a consumer index 890, In some embodiments, the buffer logic 858 at the host 854 may ensure that it reads data from the location pointed to by the consumer index 890 before that location is overwritten with a new entry by the storage device 800. If the producer index 856 and the consumer index 890 point to the same location, it may indicate that the buffer 850 is empty.

Some embodiments may implement a helper function to capture output from a specific device program in a specific ring buffer. For example, a helper function implemented as an eBPF function may be invoked as follows:
bpf_debug_log(u32 dp_id)
where dp_id may indicate a device program (e.g., debug program) identifier, and u32 may indicate a 32-bit unsigned integer. Based on the dp_id, this function may automatically place one or more debug messages output by the debug program into a ring buffer specifically for the device program.

In some embodiments, a ring buffer scheme may be implemented in a computational storage device that may expose control memory buffer (CMB) memory (e.g., for peer-to-peer access), for example, based on a coherent memory scheme such as CXL. In some embodiments, a host may be configured as a privileged user to perform the consumer function of the producer-consumer model. In some embodiments, the ring buffer 850 may be located in a specific memory region such that the host 854 and/or storage device 800 may determine through coherency if one or more entries (e.g., output data, commands, and/or the like) have been added to or removed from the ring buffer 850.

Figure 9:
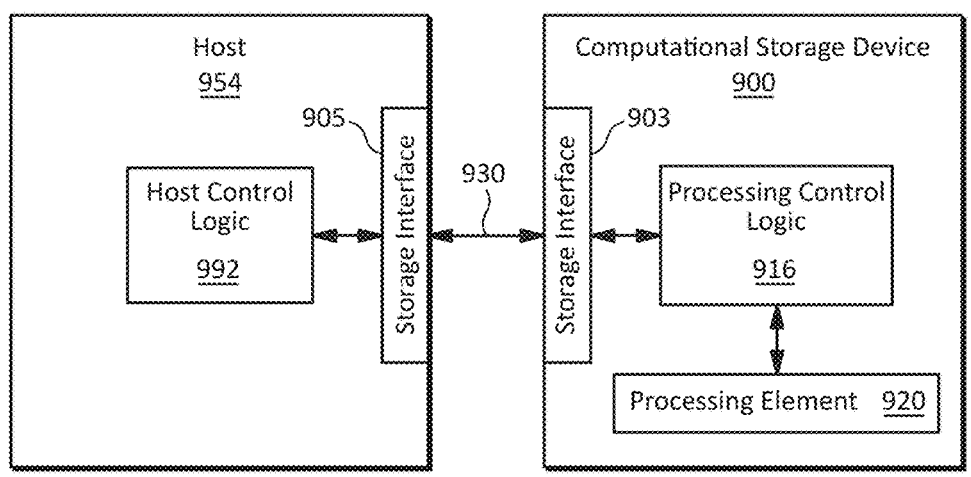
FIG. 9 illustrates an embodiment of a storage system with a device program accessible to a user using a storage protocol in accordance with example embodiments of the disclosure.

FIG. 9 illustrates an embodiment of a storage system with a device program accessible to a user using a storage protocol in accordance with example embodiments of the disclosure. The embodiment illustrated in FIG. 9 may be used, for example, to implement any of the techniques disclosed herein.

Referring to FIG. 9, the system may include a host 954 and a computational storage device 900 connected by communication fabric 930. The host 954 may include a first storage interface 905 and host control logic 992. The first storage interface 905 may be configured to exchange information using a storage protocol such as NVMe. The host control logic 992 may be configured to send one or more commands to the storage device 900 through the first storage interface 905 using the storage protocol. The command may be, for example, a query command to determine one or more device programs supported by the storage device 900, a start command to execute a device program, and/or the like.

The computational storage device 900 may include a second storage interface 903, processing control logic 916, and one or more processing elements 920. The second storage interface 903 may be configured to exchange information with the host 954 using the storage protocol. The processing control logic 916 may be configured to receive the command from the user through the second storage interface 903 using the storage protocol. The one or more processing elements 920 may be configured to execute a user program, and to execute a device program based on the command received from the host 954.

In some embodiments, the host control logic 992 at the host 954 may be configured to send the user program to the storage device 900 using the storage protocol. In some embodiments, the processing control logic 916 may be configured to send information about one or more device programs to the host 954.

In some embodiments, the host control logic 992 may be implemented, for example, with a driver for the storage device 900, an application running on the host 954, and/or the like. The processing control logic 916 and one or more processing elements 920 may be implemented, for example, with a processing controller 316 and processing elements 320, respectively, illustrated in FIG. 3.

Any of the storage devices disclosed herein may be implemented in any form factor such as 3.5 inch, 2.5 inch, 1.8 inch, M.2, Enterprise and Data Center SSD Form Factor (EDSFF), NF1, and/or the like, using any connector configuration such as Serial ATA (SATA), Small Computer System Interface (SCSI), Serial Attached SCSI (SAS), U.2, and/or the like.

Any of the storage devices disclosed herein may be implemented entirely or partially with, and/or used in connection with, a server chassis, server rack, dataroom, datacenter, edge datacenter, mobile edge datacenter, and/or any combinations thereof.

Figure 10:
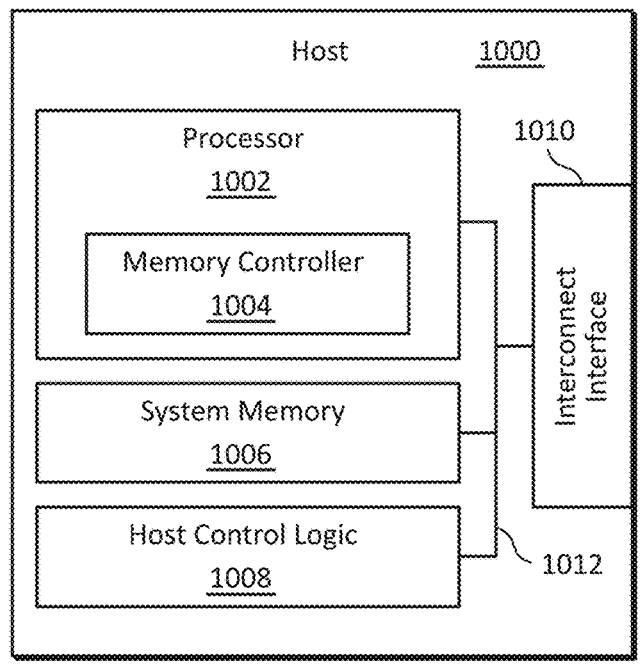
FIG. 10 illustrates an example embodiment of a host apparatus that may be used to provide a user with access to a device program in accordance with example embodiments of the disclosure.

FIG. 10 illustrates an example embodiment of a host apparatus that may be used to provide a user with access to a device program in accordance with example embodiments of the disclosure. The host apparatus 1000 illustrated in FIG. 10 may include a processor 1002, which may include a memory controller 1004, a system memory 1006, host control logic 1008, and/or an interconnect interface 1010, which may be implemented, for example using CXL. Any or all of the components illustrated in FIG. 10 may communicate through one or more system buses 1012. In some embodiments, one or more of the components illustrated in FIG. 10 may be implemented using other components. For example, in some embodiments, the host control logic 1008 may be implemented by the processor 1002 executing instructions stored in the system memory 1006 or other memory.

Figure 11:
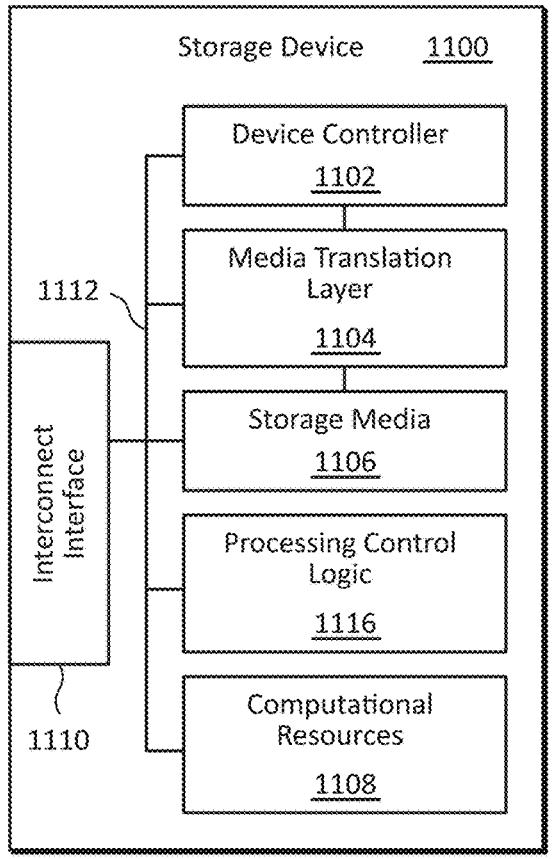
FIG. 11 illustrates an example embodiment of a storage device that may be used to provide a user with access to a device program in accordance with example embodiments of the disclosure.

FIG. 11 illustrates an example embodiment of a storage device that may be used to provide a user with access to a device program in accordance with example embodiments of the disclosure. The storage device 1100 may include a device controller 1102, a media translation layer 1104, a storage media 1106, computational resources 1108, processing control logic 116, and an interconnect interface 1110, The components illustrated in FIG. 11 may communicate through one or more device buses 1112. In some embodiments that may use flash memory for some or all of the storage media 1106, the media translation layer 1104 may be implemented partially or entirely as a flash translation layer (FTL). In some embodiments, the storage device 1100 illustrated in FIG. 11 may be used to implement any of the device-side functionality relating to providing a user with access to a device program disclosed herein.

Any of the functionality described herein, including any of the host functionality, device functionally, and/or the like described with respect to the embodiments illustrated in FIG. 8, FIG. 9, FIG. 10, and/or FIG. 11 may be implemented with hardware, software, or any combination thereof. For example, any of the buffer logic 858 and/or 838, host control logic 992 and/or 1008, processing control logic 916 and/or 1116, one or more processing elements 920, device controller 1102, computational resources 1108, and/or the like may be implemented with combinational logic, sequential logic, one or more timers, counters, registers, state machines, volatile memories such as DRAM and/or SRAM, nonvolatile memory and/or any combination thereof, CPLDs, FPGAs, ASICs, CPUs including CISC processors such as x86 processors and/or RISC processors such as ARM processors, GPUs, NPUs, and/or the like, executing instructions stored in any type of memory. In some embodiments, one or more components may be implemented as a system-on-chip (SOC).

Figure 12:
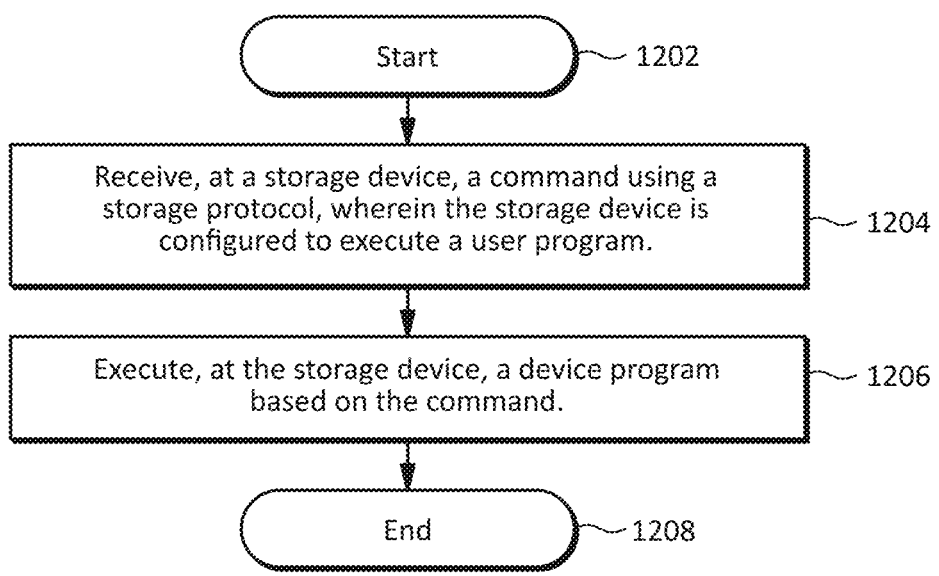
FIG. 12 illustrates an embodiment of a method for providing a user with access to a device program in accordance with example embodiments of the disclosure.

FIG. 12 illustrates an embodiment of a method for providing a user with access to a device program in accordance with example embodiments of the disclosure. The method may begin at operation 1202. At operation 1204, the method may receive, at a storage device, a command using a storage protocol, wherein the storage device is configured to execute a user program. For example, in some embodiments, the storage protocol may be implemented with NVMe, and the command may be implemented as a start command that may be formatted as an NVMe command. At operation 1206, the method may execute, at the storage device, a device program based on the command. The device program may implement, for example, a utility for tracing, debugging, profiling, and/or the like, the user program. The method may end at operation 1208.

The embodiment illustrated in FIG. 12, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, a reference to a thing may refer to at least a portion of the thing, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method comprising:
receiving, at a storage device, a command for a device program on the storage device using a storage protocol, wherein the storage device is configured to execute a user program;
validating the command, wherein validating the command comprises confirming the device program is supported by the storage device; and
executing, at the storage device, the device program based on the command, wherein the device program operates on the user program.

2. The method of claim 1, wherein the command is a first command, the method further comprising:
receiving, at the storage device, using the storage protocol, a second command; and
sending, from the storage device, using the storage protocol, information about the device program based on the second command.

3. The method of claim 2, further comprising sending, from the storage device, using the storage protocol, a list of device programs supported by the storage device based on the second command.

4. The method of claim 1, further comprising providing, by the storage device, output data from the device program.

5. The method of claim 4, wherein the providing comprises sending, from the storage device, using the storage protocol, a log message.

6. The method of claim 4, wherein:
the providing comprises placing the output data from the device program in a buffer; and
the method further comprises reading from the buffer, by a host, using the storage protocol, the output data from the device program.

7. The method of claim 6, wherein the buffer is located, at least partially, in a memory shared by the storage device and the host.

8. The method of claim 1, wherein the storage device is configured to receive, using the storage protocol, the user program.

9. The method of claim 1, wherein the device program monitors the user program.

10. The method of claim 1, wherein the device program controls the user program.

11. The method of claim 1, wherein the device program comprises one or more of a tracing program, a debugging program, a profiling program, a monitoring program, a task manager program, or a message retrieval program.

12. The method of claim 1, wherein receiving the command comprises receiving an argument for the command.

13. A storage device comprising:
a storage medium;
a storage device controller configured to store data in the storage medium;

a storage interface configured to receive, using a storage protocol, a command for a device program on the storage medium; and at least one processing element configured to:
 execute a user program;
 validate the command comprising confirming the device program is supported by the storage device; and
 execute, based on the command, the device program, wherein the device program operates on the user program.

14. The storage device of claim 13, further comprising processing control logic configured to provide output data from the device program.

15. The storage device of claim 14, wherein the processing control logic comprises a buffer configured to store the output data.

16. The storage device of claim 15, wherein the buffer is located, at least partially, in a shared memory.

17. The storage device of claim 14, wherein the command is a first command, and the processing control logic is configured to send the output data, using the storage interface, based on a second command received using the storage interface.

18. A system comprising:
 a host comprising:
  a first storage interface configured to exchange information using a storage protocol; and
  host control logic configured to send, using the storage interface, a command for a device program on a storage device; and
 the storage device comprising:
  a second storage interface configured to exchange information with the host using the storage protocol;
  processing control logic circuitry configured to receive, from the host using the second storage interface, the command; and
  at least one processing element circuitry configured to:
   execute a user program;
   validate the command comprising confirming the device program is supported by the storage device; and
   execute, based on the command, the device program, wherein the device program operates on the user program.

19. The system of claim 18, wherein:
the host control logic is further configured to send, to the storage device, using the first storage interface, the user program; and
the processing control logic is further configured to receive, from the host using the second storage interface, the user program.

20. The system of claim 18, wherein:
the host control logic is further configured to receive, from the storage device, using the first storage interface, output data from the device program; and
the processing control logic is further configured to send, to the host, using the second storage interface, the output data from the device program.

* * * * *